(12) United States Patent
Coers

(10) Patent No.: US 7,426,817 B2
(45) Date of Patent: Sep. 23, 2008

(54) INDEPENDENT CENTER REEL POSITION ADJUSTMENT FOR AN AGRICULTURAL HARVESTING MACHINE

(75) Inventor: Bruce Alan Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 118 days.

(21) Appl. No.: 11/366,034

(22) Filed: Mar. 2, 2006

(65) Prior Publication Data

US 2007/0204583 A1 Sep. 6, 2007

(51) Int. Cl.
*A01D 34/00* (2006.01)
(52) U.S. Cl. ...................................... 56/14.4
(58) Field of Classification Search ............... 56/14.4, 56/14.5, 14.6, 10.2 E, 10.2 R, 220, 221, 208
See application file for complete search history.

(56) References Cited

U.S. PATENT DOCUMENTS

| | | | | |
|---|---|---|---|---|
| 3,345,808 A | * | 10/1967 | Van der Lely | 56/10.2 R |
| 3,468,107 A | * | 9/1969 | Van der Lely | 56/11.9 |
| 3,599,410 A | * | 8/1971 | de Coene et al. | 56/221 |
| 4,008,558 A | * | 2/1977 | Mott | 56/226 |
| 4,124,970 A | * | 11/1978 | Bernhardt | 56/10.2 E |
| 4,204,383 A | * | 5/1980 | Milliken, Jr. | 56/10.2 E |
| 4,280,318 A | * | 7/1981 | Koch | 56/221 |
| 4,377,930 A | * | 3/1983 | Halls et al. | 56/221 |
| 4,446,683 A | * | 5/1984 | Rempel et al. | 56/296 |
| 5,261,216 A | * | 11/1993 | Schumacher et al. | 56/14.4 |
| 5,350,020 A | * | 9/1994 | Vandever et al. | 171/26 |
| 5,752,372 A | * | 5/1998 | Buermann | 56/10.2 E |
| 5,768,870 A | * | 6/1998 | Talbot et al. | 56/364 |
| 6,442,918 B1 | * | 9/2002 | Fox | 56/221 |
| 6,651,411 B1 | * | 11/2003 | Becker et al. | 56/10.2 R |
| 2003/0074876 A1 | * | 4/2003 | Patterson et al. | 56/257 |
| 2007/0193243 A1 | | 8/2007 | Schmidt et al. | |

* cited by examiner

*Primary Examiner*—Árpád Fábián-Kovács

(57) ABSTRACT

A cutting platform for use with an agricultural harvesting machine includes a first platform section and a second platform section pivotally coupled together about a first axis. A first reel and a second reel are positioned in end-to-end juxtaposed relation to each other above the first platform and the second platform. A reel support arm is positioned between and carries each of the first reel and the second reel. The reel support arm is movable toward and away from the first platform section and the second platform section.

17 Claims, 4 Drawing Sheets

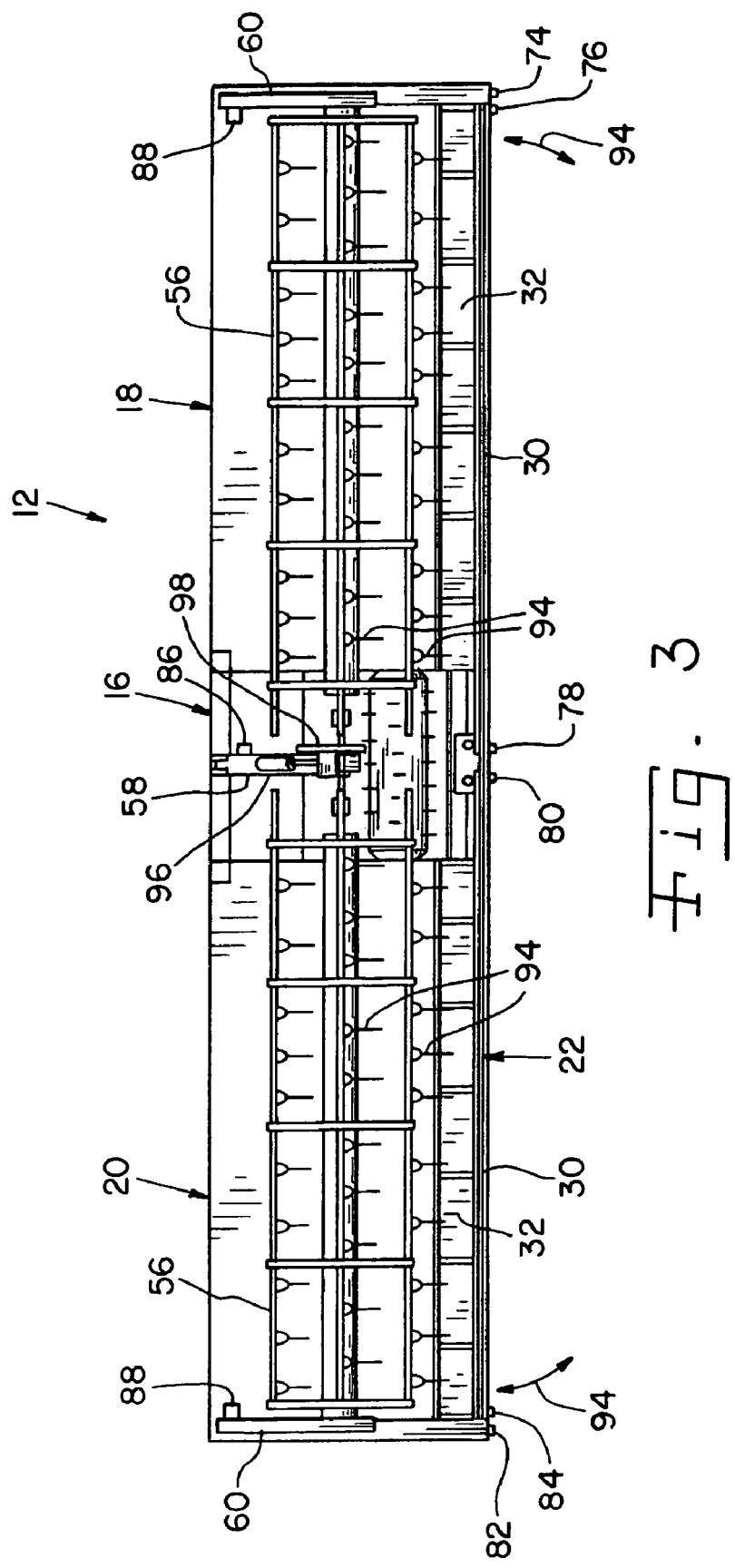

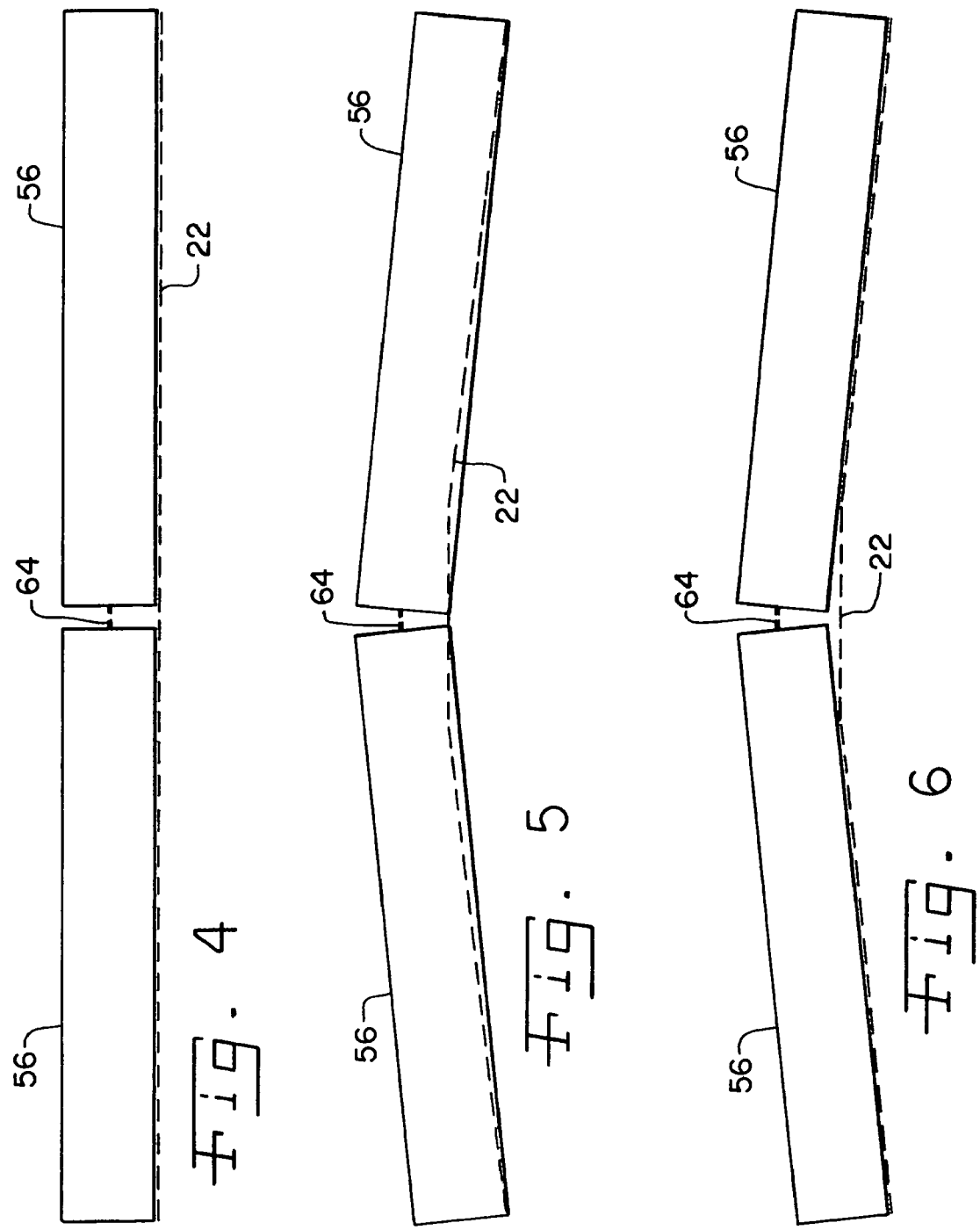

INDEPENDENT CENTER REEL POSITION ADJUSTMENT FOR AN AGRICULTURAL HARVESTING MACHINE

FIELD OF THE INVENTION

The present invention relates to agricultural harvesting machines, such as combines, and, more particularly to agricultural harvesting machines including a reel above a cutting platform for assisting in feeding of crop material through the cutting platform.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

With a rigid frame draper platform, a single reel extends across the width of the platform and is supported on either end by a movable reel support arm. The reel support arms are simultaneously moved using an actuator such as a switch or lever in the operator's cab, such that the reel remains generally parallel to the cutterbar of the cutting platform.

What is needed in the art is a draper platform which flexes to better follow the ground contour during operation, and a reel which accommodates such flexure.

SUMMARY OF THE INVENTION

The invention comprises, in one form thereof, a cutting platform for use with an agricultural harvesting machine. The cutting platform includes a first platform section and a second platform section pivotally coupled together about a first axis. A first reel and a second reel are positioned in end-to-end juxtaposed relation to each other above the first platform and the second platform. A reel support arm is positioned between and carries each of the first reel and the second reel. The reel support arm is movable toward and away from the first platform section and the second platform section.

The invention comprises, in another form thereof, a method of operating an agricultural harvesting machine, including the steps of: pivotally moving a first platform section relative to a second platform section about a first axis; rotatably supporting a first reel and a second reel above the first platform section and the second platform section with a reel support arm positioned therebetween; and moving the reel support arm toward and/or away from the first platform section and the second platform section.

BRIEF DESCRIPTION OF THE DRAWINGS

FIG. 3 is a front view of the cutting platform shown in FIGS. 1 and 2;

FIG. 4 is a front, schematic view of the cutting platform shown in FIGS. 1-3, with the frame of the cutting platform in a straight, unflexed position;

FIG. 5 is a front, schematic view of the cutting platform shown in FIGS. 1-4, with the wing platform sections pivoted downward and no center reel height compensation; and FIG. 6 is a front, schematic view of the cutting platform shown in FIGS. 1-5, with the wing platform sections pivoted downward, and including center reel height compensation.

DETAILED DESCRIPTION OF THE INVENTION

Figure 1:
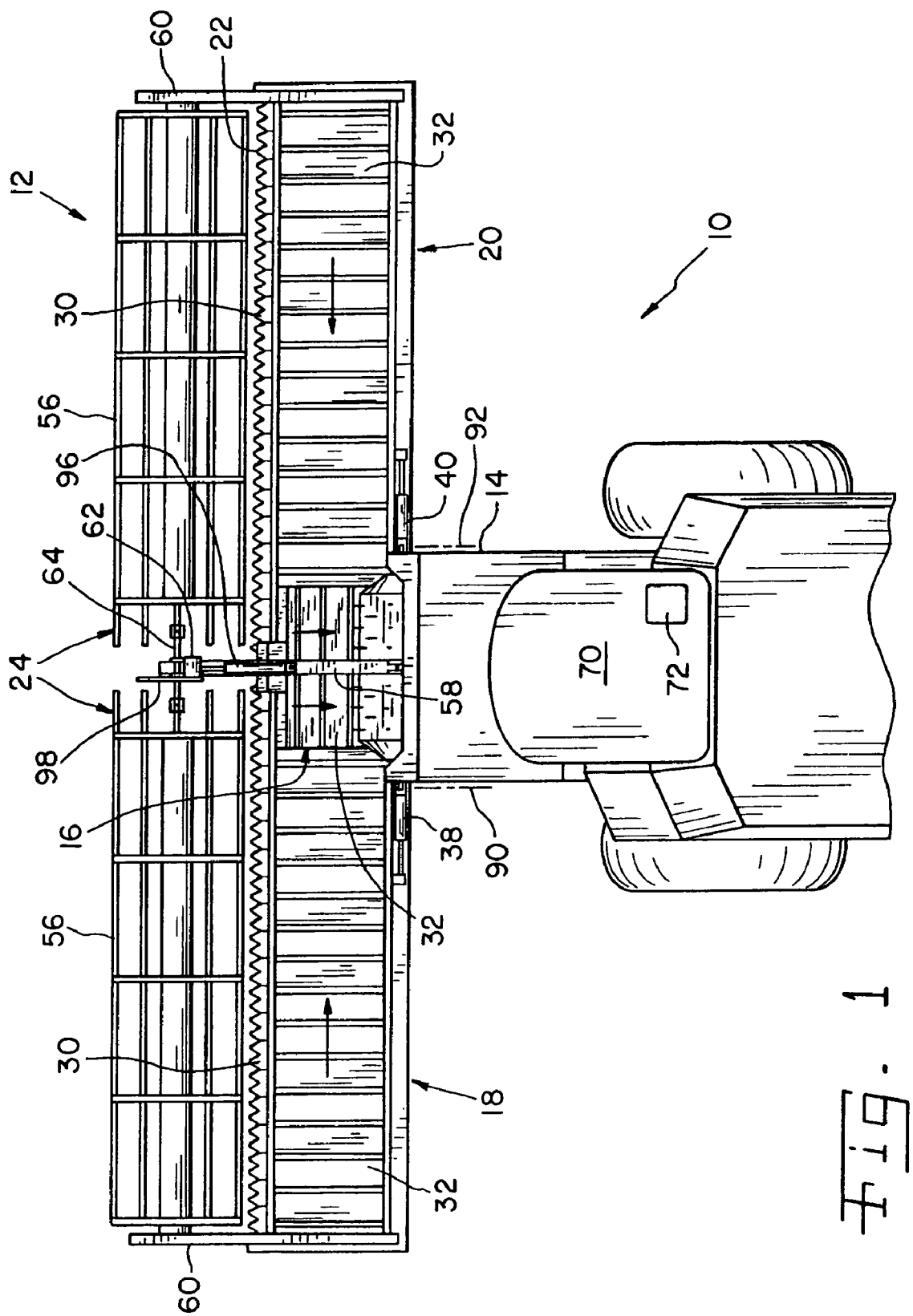
FIG. 1 is a fragmentary, top view of an agricultural combine including an embodiment of a draper platform of the present invention.
Figure 2:
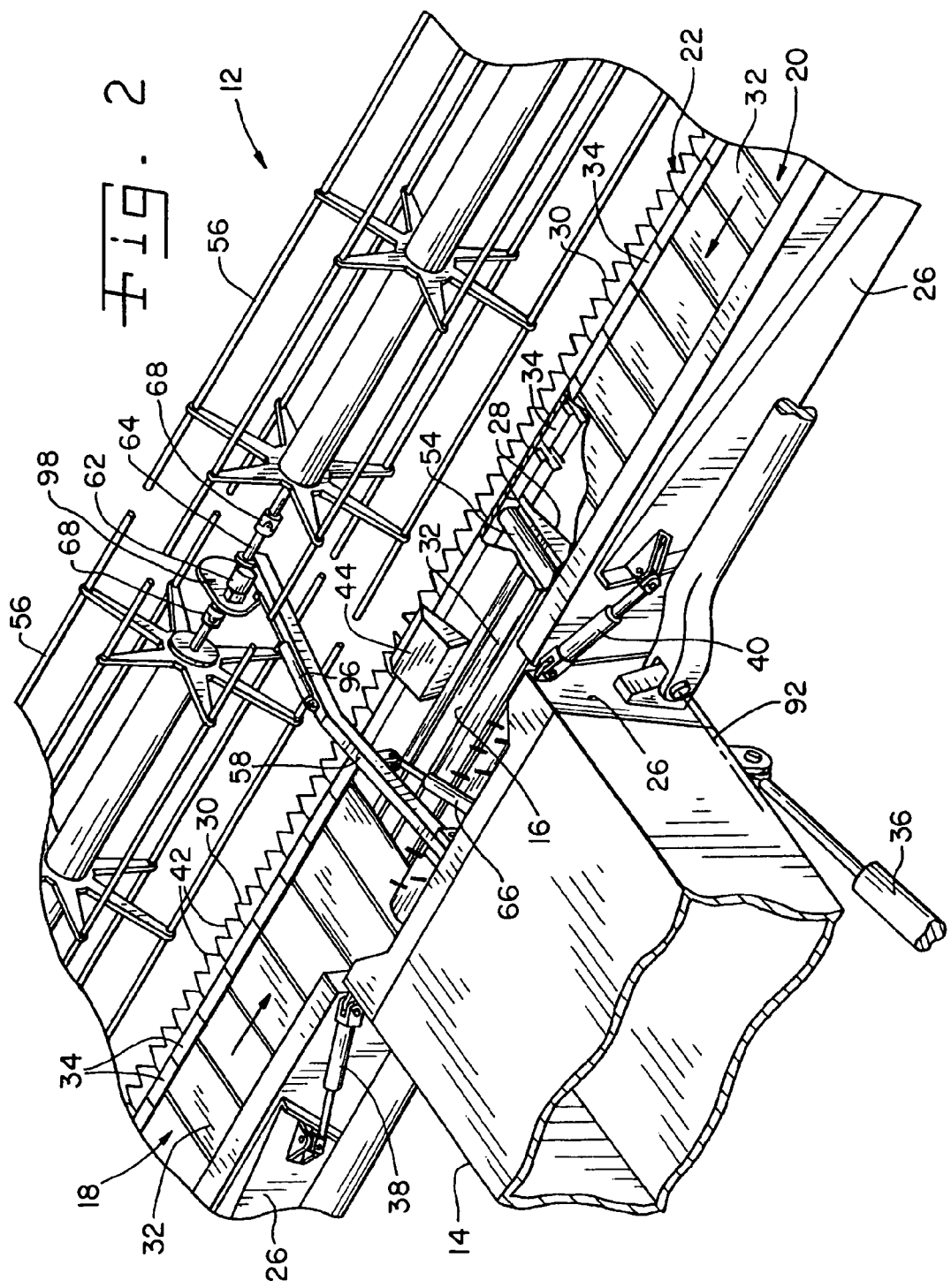
FIG. 2 is a fragmentary, perspective view of the agricultural combine of FIG. 1.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a single blade knife (as shown) or a double blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30.

Float arms 28 may be pivoted at their connection locations with a respective frame 26. Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

As shown in FIG. 3, cutting platform 12 includes a plurality of position sensors associated with platform sections 16, 18 and 20, and reels 56. More particularly, first wing platform section 18 (also referred to as a first platform section) includes a height sensor 74 and a tilt sensor 76. Center platform section 16 (also referred to as a second platform section) includes a height sensor 78 and a tilt sensor 80. Second wing platform section 20 (also referred to as a third platform section) likewise includes a height sensor 82 and a tilt sensor 84. Center reel support arm 58 includes a position sensor 86, and outer reel support arm 60 each include a position sensor 88 providing an indication of the relative pivot angle between reel support arms 58, 60 and the frame 26 of a corresponding platform section 16, 18 or 20. The relative positions of the respective sensors 74-88 are indicated along the length of cutting platform 12, but are not intended to indicate the actual positions of the respective sensors. For example, it is possible to position sensor 74, 76 and 82, 84 near the outward ends of first wing platform section 18 and second wing platform section 20 as shown. However, sensors 74, 76 and 82, 84 would not likely be positioned under the lower surface of cutting platform 12 as shown, where they may come in contact with the ground surface and possibly be damaged. It is more likely that sensors 74-84 would be carried and somewhat protected by a selected float arm 28 associated with each respective platform section 16, 18 and 20. Similarly, the mounting locations of position sensors 86 and 88 are shown for illustration only and may vary depending upon the application.

During operation, first wing platform section 18 and second wing platform section 20 pivotally move up and down relative to center platform section 16 about a respective axis 90 and 92 (FIGS. 1 and 2), as indicated by arrows 94. Concurrently, each reel 56 rotates to move the cut crop material onto endless belts 32 as the crop material is cut using cutter bar assembly 22. To that end, each reel 56 carries a plurality of tines 94 at predetermined positions (only a few of which are shown), each tine having a predetermined length. The plurality of tines 94 orient the crop material ahead of cutterbar assembly 22 to be cut with knives 42 in opposition with knife guards (not shown). The crop material is then moved across cutterbar assembly 22 and onto endless belts 32 where it is conveyed to center platform section 16 and feeder housing 14.

Referring to FIG. 4, the overall profile of reels 56 (including tines 94) relative to cutterbar assembly 22 is shown when first wing platform section 18 and second wing platform section 20 are in a straight, unflexed position. This is the position of reels 56 when cutting platform 12 is operating over a ground surface which is substantially flat across the width thereof. As is apparent, the profiles of reels 56 do not impinge on cutter bar assembly 22 (shown with dashed line) when in a straight, unflexed position.

FIG. 5 illustrates the outer profile of each reel 56 (including tines 94) relative to cutterbar assembly 22 when first wing platform section 18 and second wing platform section 20 are pivoted downward relative to center platform section 16, and center reel support arm 58 is maintained in a stationary position (i.e., no center reel height compensation). As is apparent, the tines of each reel 56 overlay the profile of cutterbar assembly 22, and therefore the tines would engage with knives 42 of cutterbar assembly 22. This would likely result in damage to the tines 94, knives 42 and/or knife guards 46. This in turn would result in unnecessary time and expense in repairing the broken parts.

Referring now to FIG. 6, the outer profile of each reel 56 (including tines 94) is shown when first wing platform section 18 and second wing platform section 20 are pivoted downward relative to center platform section 16, and center reel support arm 58 is moved in an upward direction such that tines 94 do not impinge with cutterbar assembly 22. Height and tilt sensors 74-84 are used to determine the relative orientation and operating height of platform sections 16, 18 and 20. Position sensor 86 is used to detect the position of center reel support arm 58, and position sensors 88 are used to detect the position of outer reel support arms 60. The output signals from sensors 74-88 are transmitted to controller 72 onboard combine 10, typically within cab 70. It may also be desirable to utilize an output signal from a position sensor (not shown) associated with lift cylinder 66 to determine the height of platform sections 16, 18, and 20. Controller 72 controllably actuates hydraulic cylinder 66 coupled with center reel support arm 58 to thereby move the adjacent inboard ends of reels 56 in an upward direction relative to cutterbar assembly 22. The extent to which center reel support arm 58 is moved can be determined mathematically using the input sensor signals, or may be determined empirically using a lookup table depending upon the relative orientations between platform sections 16, 18 and 20.

As another possibility, it will be noted in FIGS. 1 and 2 that center reel support arm 58 carries an additional hydraulic cylinder 96 coupled with an offset mounting plate 98. Plate 98 carries hydraulic motor 62, and rotatably carries drive shaft 64. Because of the offset nature in which mounting plate 98 is attached with center reel support arm 58, the inboard, adjacent ends of reels 56 pivot upward and away from cutterbar assembly 22 when the ram of hydraulic cylinder 96 is extended from the position shown in FIG. 2. It is thus possible to move the adjacent, inboard ends of reels 56 relative to cutterbar assembly 22 using hydraulic cylinder 66 and/or hydraulic cylinder 96, dependent upon a desired clearance distance beneath reels 56.

Having described the preferred embodiment, it will become apparent that various modifications can be made without departing from the scope of the invention as defined in the accompanying claims.

The invention claimed is:

1. An agricultural harvesting machine, comprising:
   a feeder housing, and
   a cutting platform attached to said feeder housing, said cutting platform including:
   a first platform section and a second platform section pivotally coupled together about a first axis;
   a first reel and a second reel positioned in end-to-end juxtaposed relation to each other;
   at least one outer reel support arm, each said outer reel support arm positioned at an outboard end of a corresponding one of said first reel and said second reel; and
   a reel support arm positioned between and carrying each of said first reel and said second reel, said reel support arm being independently movable, relative to said at least one outer reel support arm, toward and away from said first platform section and said second platform section.

2. The agricultural harvesting machine of claim 1, including a third platform section pivotally coupled together with said second platform section about a second axis.

3. The agricultural harvesting machine of claim 2, wherein said first platform section and said third platform section each comprise a wing platform section, and said second platform section comprises a center platform section, said reel support arm being pivotally coupled with said center platform section, and said at least one outer reel support arm includes a pair of outer reel support arms respectively positioned at outboard ends of said first reel and said second reel.

4. The agricultural harvesting machine of claim 3, wherein said outer reel support arms are movable toward and away from a respective said wing platform section.

5. The agricultural harvesting machine of claim 4, further including a plurality of position sensors, each of said first platform section and said second platform section including at least one position sensor associated therewith, said reel support arm and said outer reel support arms being independently movable relative to each other dependent upon output signals from said position sensors.

6. The agricultural harvesting machine of claim 2, wherein said first axis is a generally horizontal axis and said second axis is a generally horizontal axis.

7. A cutting platform for use with an agricultural harvesting machine, comprising:
   a first platform section and a second platform section pivotally coupled together about a first axis;
   a first reel and a second reel positioned in end-to-end juxtaposed relation to each other above said first platform and said second platform;
   at least one outer reel support arm, each said outer reel support arm positioned at an outboard end of a corresponding one of said first reel and said second reel; and
   a reel support arm positioned between and carrying each of said first reel and said second reel, said reel support arm being independently movable, relative to said at least one outer reel support arm, toward and away from said first platform section and said second platform section.

8. The cutting platform of claim 7, including a third platform section pivotally coupled together with said second platform section about a second axis.

9. The cutting platform of claim 8, wherein said first platform section and said third platform section each comprise a wing platform section, and said second platform section comprises a center platform section, said reel support arm being pivotally coupled with said center platform section, and said at least one outer reel support arm includes a pair of outer reel support arms respectively positioned at outboard ends of said first reel and said second reel.

10. The cutting platform of claim 9, wherein said outer reel support arms are movable toward and away from a respective said wing platform section.

11. The cutting platform of claim 10, further including a plurality of position sensors, each of said first platform section and said second platform section including at least one position sensor associated therewith, said reel support arm and said outer reel support arms being independently movable relative to each other dependent upon output signals from said position sensors.

12. The cutting platform of claim 8, wherein said first axis is a generally horizontal axis and said second axis is a generally horizontal axis.

13. A method of operating an agricultural harvesting machine, comprising the steps of:
 pivotally moving a first platform section relative to a second platform section about a first axis;
 rotatably supporting a first reel and a second reel above said first platform section and said second platform section with a reel support arm positioned therebetween and at least one outer reel support arm, each said outer reel support arm positioned at an outboard end of a corresponding one of said first reel and said second reel; and
 independently moving said reel support arm, relative to said at least one outer reel support arm, at least one of toward and away from said first platform section and said second platform section.

14. The method of operating an agricultural harvesting machine of claim 13, establishing a clearance distance between said first reel and said second reel relative to a respective one of said first platform and said second platform, said step of moving said reel support arm being dependent upon said established clearance distance.

15. The method of operating an agricultural harvesting machine of claim 14, wherein each of said first reel and said second reel includes a plurality of tines, said clearance distance being dependent upon a length of said tines.

16. The method of operating an agricultural harvesting machine of claim 15, wherein each of said first platform section and said second platform section includes a cutter bar, and said clearance distance is based upon a clearance distance between said plurality of tines and said respective cutter bar.

17. The method of operating an agricultural harvesting machine of claim 13, including the step of pivotally moving a third platform section relative to said second platform section about a second axis; and said clearance distance is based upon a clearance distance between said first reel and said first axis, and a clearance distance between said second reel and said second axis.

* * * * *